(12) United States Patent
Iwai et al.

(10) Patent No.: US 8,738,998 B2
(45) Date of Patent: *May 27, 2014

(54) TRANSMITTING APPARATUS AND TRANSMITTING METHOD

(75) Inventors: Takashi Iwai, Ishikawa (JP); Sadaki Futagi, Ishikawa (JP); Atsushi Matsumoto, Ishikawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 884 days.

This patent is subject to a terminal disclaimer.

(21) Appl. No.: 12/911,496

(22) Filed: Oct. 25, 2010

(65) Prior Publication Data

US 2011/0041045 A1    Feb. 17, 2011

Related U.S. Application Data

(63) Continuation of application No. 12/089,700, filed as application No. PCT/JP2006/319788 on Oct. 3, 2006, now Pat. No. 7,844,881.

(30) Foreign Application Priority Data

Oct. 11, 2005 (JP) ................................ 2005-296752

(51) Int. Cl.
*G06F 11/10* (2006.01)
(52) U.S. Cl.
USPC .......................................... 714/774; 714/779
(58) Field of Classification Search
CPC ............................... G06F 11/10; H04L 1/0001
USPC .................... 714/774, 779; 455/13.4
See application file for complete search history.

(56) References Cited

U.S. PATENT DOCUMENTS 5,828,677 A * 10/1998 Sayeed et al. ................. 714/774
5,844,918 A    12/1998 Kato
(Continued)

FOREIGN PATENT DOCUMENTS

EP    1032140    8/2000
JP    2003-018131    1/2003
(Continued)

OTHER PUBLICATIONS

International Search Report dated Dec. 19, 2006.
(Continued)

*Primary Examiner* — M. Mujtaba K Chaudry
(74) *Attorney, Agent, or Firm* — Dickinson Wright PLLC

(57) ABSTRACT

A transmitting apparatus and a transmitting method wherein the systematic bit reception quality can be improved and the throughput performance can be improved. An IR parameter control part (101) controls, based on the number of retransmissions, the ratio of systematic bits to parity bits in mapping them to packets, and controls to map a parity bit to an initially transmitted packet, while mapping a systematic bit to a retransmitted packet. An encoding part (102) generates the systematic bits and parity bits and maps them to the packets in accordance with the IR parameters. A transmission power calculating part (105) calculates, based on reception quality information of the initially transmitted packet fed back from a receiving end, the transmission power of the transmitted packet to which the systematic bit is mapped. A transmission power control part (106) controls the transmission power of the retransmitted packet such that it is equal to the transmission power as calculated by the transmission power calculating part (105).

10 Claims, 6 Drawing Sheets

(56) References Cited

U.S. PATENT DOCUMENTS

| | | |
|---|---|---|
| 6,975,582 B1 | 12/2005 | Karabinis |
| 7,000,174 B2 | 2/2006 | Mantha |
| 7,224,702 B2 * | 5/2007 | Lee ................ 370/473 |
| 7,430,190 B2 | 9/2008 | Luo |
| 7,539,122 B2 | 5/2009 | Agin |
| 2001/0034209 A1 * | 10/2001 | Tong et al. ............ 455/69 |
| 2002/0114404 A1 | 8/2002 | Aizawa |
| 2003/0021240 A1 * | 1/2003 | Moon et al. .......... 370/320 |
| 2003/0123389 A1 | 7/2003 | Russell |
| 2003/0126551 A1 * | 7/2003 | Mantha et al. .......... 714/790 |
| 2004/0171387 A1 | 9/2004 | Miyoshi |
| 2005/0053168 A1 | 3/2005 | Song |
| 2005/0114744 A1 | 5/2005 | Miyoshi |
| 2005/0201283 A1 | 9/2005 | Yoon |
| 2006/0068825 A1 * | 3/2006 | Iochi ............................ 455/522 |

FOREIGN PATENT DOCUMENTS

| | | |
|---|---|---|
| JP | 2004-112597 | 4/2004 |
| JP | 2004-253828 | 9/2004 |
| JP | 2005-065323 | 3/2005 |
| WO | 2004/042992 | 5/2004 |
| WO | 2005/022883 | 3/2005 |

OTHER PUBLICATIONS

European Search Report dated Sep. 20, 2011.

* cited by examiner

TRANSMITTING APPARATUS AND TRANSMITTING METHOD

This is a continuation application of application Ser. No. 12/089,700 filed Apr. 9, 2008, which is a national stage of PCT/JP2006/319788 filed Oct. 3, 2006, which is based on Japanese Application No. 2005-296752 filed Oct. 11, 2005, the entire contents of each which are incorporated by reference herein.

TECHNICAL FIELD

The present invention relates to a transmitting apparatus and transmission method for transmitting systematic bits and parity bits.

BACKGROUND ART

As high speed packet transmission schemes in IMT-2000 (International Mobile Telecommunication-2000), studies are being conducted for HSDPA (High Speed Downlink Packet Access) and HSUPA (High Speed Uplink Packet Access) that are directed to implementing increased peak transmission speed and high throughput, for example. Moreover, in addition to the above-described schemes, high speed packet transmission schemes directed to implementing further increased speed, are being conducted in 3GPP RAN LTE (Long term Evolution). In these high speed packet transmission schemes, the Hybrid-ARQ technique is necessary for improving throughput.

Hybrid-ARQ refers to a transmission method combining ARQ (Auto Repeat request) and FEC (Forward Error Correction), and is a technique of combining retransmission data and data that is received earlier and that nevertheless cannot be decoded, and performing error correction decoding. This makes it possible to improve SINR and coding gain enables decoding at smaller number of retransmissions than normal ARQ, and consequently, realizes improved received quality and efficient transmission.

The IR (Incremental Redundancy) scheme of this Hybrid-ARQ uses turbo code, is employed in HSDPA and HSDPA, and is likely to be adopted also in the 3GPP RAN LTE.

The IR scheme of Hybrid-ARQ is disclosed in Patent Document 1, and this scheme will be explained below using FIG. 1. In the IR scheme, as shown in FIG. 1, the transmitting side performs turbo coding and transmits information bits (hereinafter "systematic bits") first in signals after turbo coding and the receiving side performs error detection. Upon detecting an error, the receiving side returns a NACK (Negative ACKnowlegement) signal to the transmitting side. In this case, the transmitting side transmits FEC parity bit 1 for error correction, and the receiving side performs turbo decoding using systematic bits and parity bit 1. When another error is detected, in response to a NACK signal from the receiving side, the transmitting side also transmits FEC parity bit 2 for error coding, and the receiving side performs turbo decoding using systematic bits and parity bits 1 and 2.

Patent Document 1: Japanese Patent Application Laid-Open No.2003-018131

DISCLOSURE OF INVENTION

Problems to be Solved by the Invention

However, the IR scheme of Hybrid-ARQ described above has the following problems. In turbo coding, quality of systematic bits in received signals has a significant influence upon signal quality of after decoding. That is, when quality of systematic bits is not good (e.g. received SIR is low), coding gain of interest is not acquired even when quality of parity bits is high, and, consequently, decoded signal of high quality cannot be acquired.

Consequently, with the IR scheme described above, in which systematic bits are transmitted first and parity bits are transmitted in retransmissions, if systematic bits transmitted first are deteriorated in quality due to channel conditions including fading, even though a lot of parity bits are transmitted after that, quality does not improved after combining, and consequently, useless retransmissions continue. This may result in deterioration of throughput performance.

It is therefore an object of the present invention to provide a transmitting apparatus and transmission method that improve received quality of systematic bits and throughput performance.

Means for Solving the Problem

The transmitting apparatus of the present invention adopts a configuration including: a coding section that performs coding processing of transmission data and generates systematic bits and parity bits; an incremental redundancy parameter controlling section that controls an incremental redundancy parameter representing a rate of mapping the systematic bits and the parity bits in transmission units and controls the coding section to map the parity bits in a first transmission unit and the systematic bits in a second transmission unit transmitted after the first transmission unit; and a transmission power controlling section that controls transmission power for the second transmission unit based on received quality information for the first transmission unit fed back from a receiving side.

The transmission method of the present invention includes steps of: an incremental redundancy controlling step of controlling an incremental redundancy parameter representing a rate of mapping the systematic bits and the parity bits in transmission units and controlling mapping the parity bits in a first transmission unit and the systematic bits in a second transmission unit transmitted after the first transmission unit; and an transmission power controlling step of controlling transmission power for the second transmission unit based on received quality information of the first transmission unit fed back from a receiving side.

Advantageous Effect of the Invention

According to the present invention, received quality of systematic bits and throughput performance can be improved.

BEST MODE FOR CARRYING OUT THE INVENTION

Now, embodiments of the present invention will be described in detail with reference to the accompanying drawings.

Embodiment 1

Figure 1:
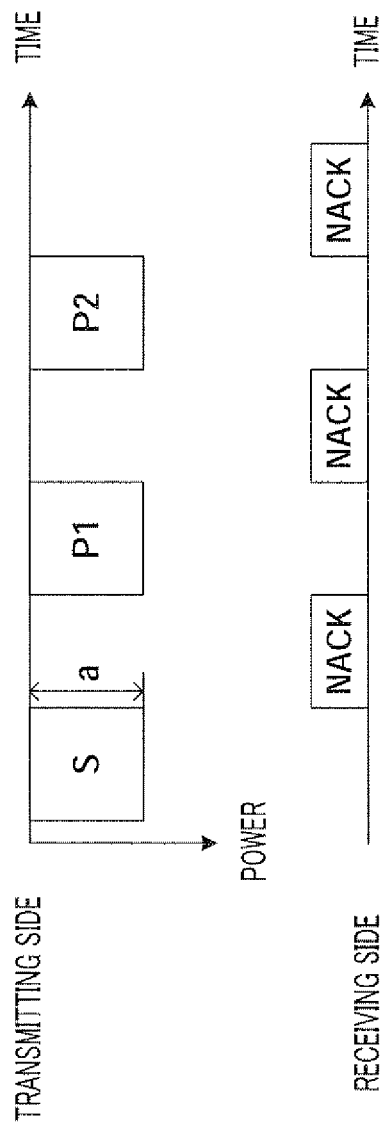
FIG. 1 explains the IR scheme of Hybrid-ARQ disclosed in Patent document 1.
Figure 2:
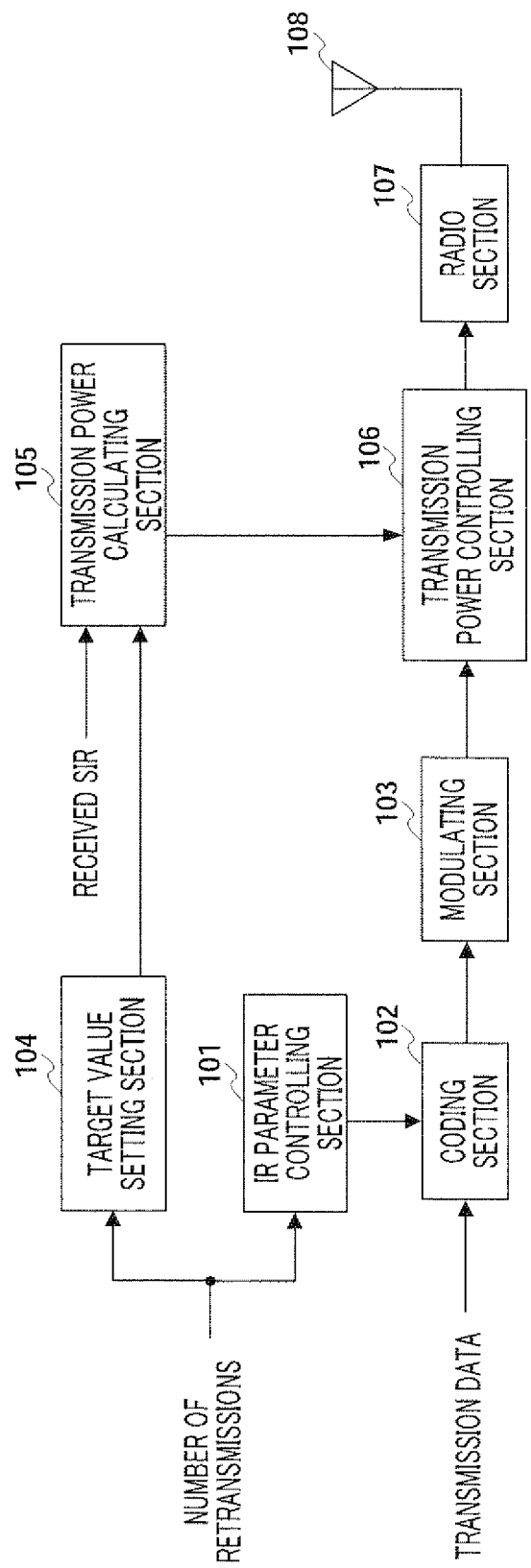
FIG. 2 is a block diagram showing a configuration of the transmitting apparatus according to Embodiments 1 and 3 of the present invention.

FIG. 2 is a block diagram showing the configuration of the transmitting apparatus according to Embodiment 1 of the present invention. In this figure, IR parameter controlling section 101 receives as input information of the number of retransmissions, and, based on the number of retransmissions, controls the rate of mapping systematic bits and parity bits in packets (hereinafter "IR parameter"). To be more specific, parity bits are mapped in packets transmitted for the first time ("initial transmission packets"), for which the number of retransmissions is therefore zero, and systematic bits are mapped in packets transmitted for a second time ("retransmission packets"), for which the number of retransmissions is therefore one. The IR parameter controlled by IR parameter controlling section 101 is outputted to coding section 102.

Coding section 102 receives as input transmission data, encodes the inputted transmission data using coding schemes such as turbo coding, and generates systematic bits and parity bits. Coding section 102 holds the generated systematic bits and parity bits and outputs the systematic bits and parity bits to modulating section 103 according to IR parameters outputted from IR parameter controlling section 101.

Modulating section 103 performs modulating processing on the systematic bits and parity bits outputted from coding section 102, and generates modulated data. The generated modulated data is outputted to transmission power controlling section 106.

Target value setting section 104 provides a target value for received quality of packets for every MCS (Modulation and Coding Scheme) and for every number of retransmissions, sets the target values matching the inputted numbers of retransmissions and outputs the set target values to transmission power calculating section 105. A target value in this context is an SIR (hereinafter "target SIR") meeting a BLER of interest (e.g. BLER=0.01), and this target SIR may be measured in advance, in simulations for example, for every MCS and for every number of retransmissions, and given in a table. The reason for setting a target value for every number of retransmissions is that the coding rate (coding gain) changes depending on the number of retransmissions. By using the target SIR's matching coding gain, it is possible to fulfill quality of interest and reduce transmission power.

Transmission power calculating section 105 receives as input received quality information for an initial transmission packet fed back from the receiving side, and, based on this received quality information (received SIR) and the target value outputted from target value setting section 104, calculates transmission power for a retransmission packet where systematic bits are mapped. If the target SIR is $SIR_{target}$, the received SIR fed back from the receiving side is $SIR_{measurement}$, the transmission power for the initial packet is P1, and the transmission power for the retransmission packet is P2, the method of calculating transmission power can be represented by the following equation 1:

(Equation 1)

$$P2 = P1 \times (SIR_{target}/SIR_{measurement}) \quad [1]$$

Transmission power calculated as such is outputted to transmission power controlling section 106. The value of transmission power for the initial transmission packet is set in advance.

Transmission power controlling section 106 controls the transmission power for the modulated data outputted from modulating section 103, that is, the transmission power for packet data, to the transmission power outputted from transmission power calculating section 105, and outputs the packet data subjected to power control to radio section 107. Transmission power calculating section 105 and transmission power controlling section 106 function as a transmission power controlling section.

Radio section 107 performs predetermined transmission processing including up-conversion, on the packet data outputted from transmission power controlling section 106 and transmits by radio the packet data subjected to transmission processing via antenna 108.

Figure 3:
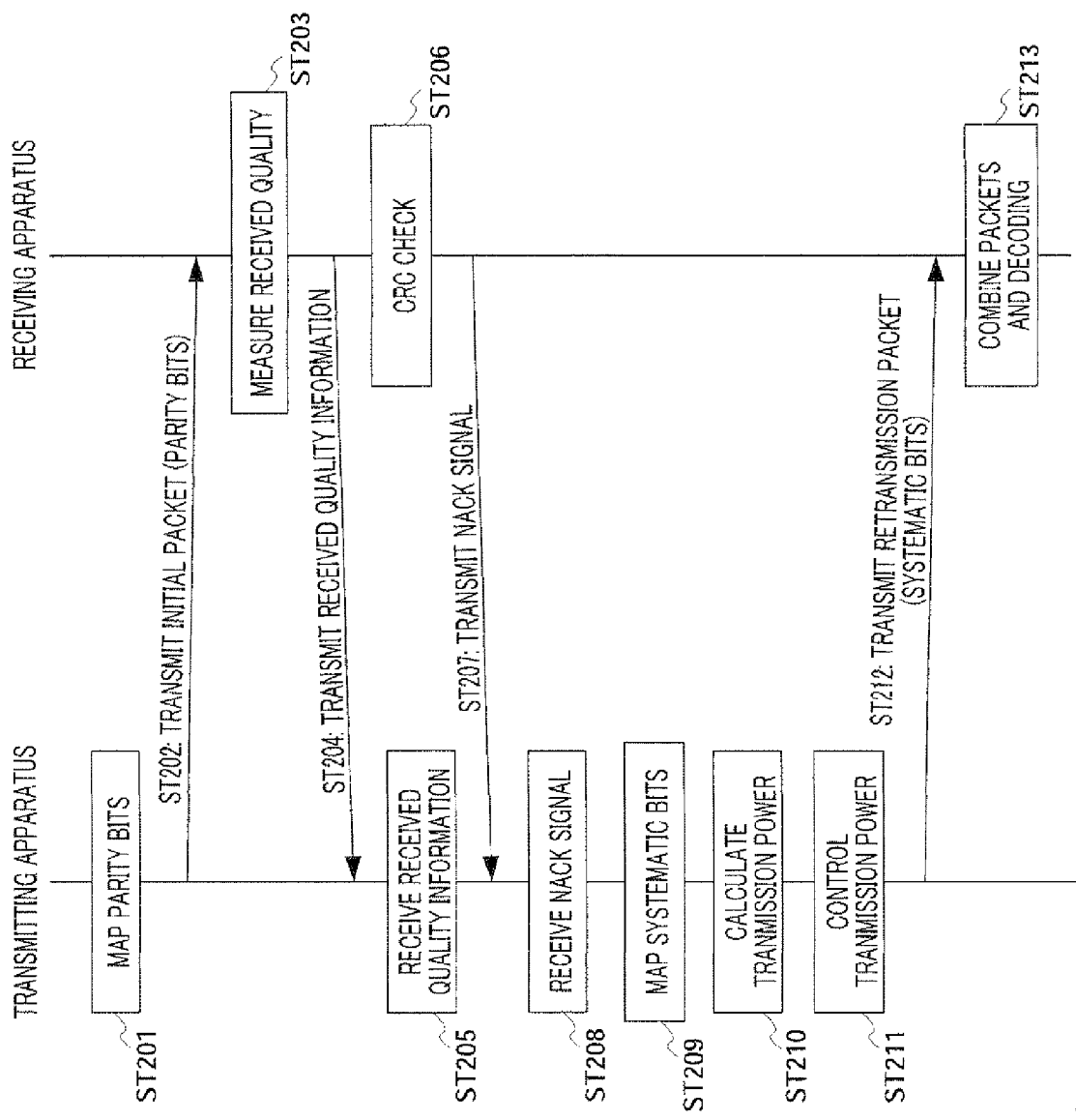
FIG. 3 illustrates a sequence diagram showing the steps of communications between the transmitting apparatus shown in FIG. 2 and the receiving apparatus, which is a communicating party of this transmitting apparatus.

Next, the steps of communications between the transmitting apparatus described above and the receiving apparatus, which is a communicating party of this transmitting apparatus, will be explained using FIG. 3. Referring to FIG. 3, in ST201, IR parameter controlling section 101 controls coding section 102 to map parity bits in the initial transmission packet, and transmission power controlling section 106 controls the transmission power for the initial transmission packet to the transmission power set in advance in transmission power calculating section 105. In ST202, the transmitting apparatus transmits the initial transmission packet where parity bits are mapped, from radio section 107 to the receiving apparatus.

In ST203, the receiving apparatus receives the initial transmission packet transmitted from the transmitting apparatus and measures received quality of the received initial transmission packet. In ST204, the receiving apparatus feeds back received quality information to the transmitting apparatus. In ST205, the transmitting apparatus receives the received quality information fed back from the receiving apparatus.

In ST206, the receiving apparatus decodes the initial transmission packet which the receiving apparatus receives in ST203, and performs a CRC check. Packets transmitted for the first time have parity bits mapped therein and are necessarily decided to contain error, and, in ST207, the receiving apparatus transmits a NACK signal to the transmitting apparatus.

In ST208, the transmitting apparatus receives the NACK signal transmitted from the receiving apparatus, and, in ST209, based on the NACK signal received in ST208, IR parameter controlling section 101 controls coding section 102 to map systematic bits in a retransmission packet. In ST210, using the received quality information received in ST207, transmission power calculating section 105 calculates the transmission power for the retransmission packet.

In ST211, transmission power controlling section 106 performs power control for the retransmission packet with the transmission power calculated in ST210. By this means, the retransmission packet can be set to minimum transmission power that can acquire received quality of interest, so that it is possible to reduce interference to other users and improve overall system throughput. Then, in ST212, the transmitting apparatus transmits the retransmission packet where systematic bits are mapped, from radio section 107 to the receiving apparatus.

In ST213, the receiving apparatus receives the retransmission packet transmitted from the transmitting apparatus, combines the received retransmission packet and the initial transmission packet received earlier, and decodes the combined packet. In this way, by maintaining received quality of systematic bits, which are important in error correction, to received quality of interest, it is possible to produce coding gain after packet combining and improve received quality.

In this way, according to Embodiment 1, by mapping and transmitting parity bits in the initial transmission packet and controlling transmission power for a retransmission packet, in which systematic bits are mapped, based on received quality information for the initial transmission packet fed back from the receiving side, systematic bits can be transmitted with transmission power matching channel conditions, so that it is possible to improve received quality of systematic bits and reception performance after packet combining. Moreover, transmission power for systematic bits can be set to a minimum that can acquire received quality of interest, so that it is possible to reduce interference to other users and improve overall system throughput.

Incidentally, although the present embodiment has been described above such that parity bits are mapped in the initial transmission packet in IR parameter controlling section 101, systematic bits may be allocated in the initial transmission packet as well with parity bits. By this means, if channel conditions are good, it is possible to decode the initial transmission packet alone without retransmission.

Moreover, although the present embodiment has been described above such that the transmission power for the initial transmission packet is set in advance in transmission power calculating section 105, this value may be set lower (i.e. first transmission power) to increase transmission power for the retransmission packet higher than for the first transmission power. This suppresses the first transmission power low, so that it is possible to reduce interference to other users and improve overall system throughput.

Moreover, with the present embodiment, although the method represented by equation 1 has been described for the method of calculation in transmission power calculating section 105, if received quality of the initial transmission packet is deteriorated equal to or below a predetermined threshold, a predetermined amount of offset may be added to the transmission power for the retransmission packet. That is, if the offset is $P_{offset}$, the following equation 2 is represented.

(Equation 2)

$$P2 = P1 \times (SIR_{target}/SIR_{measurement}) \times P_{offset} \quad [2]$$

By this means, it is possible to retransmit systematic bits more reliably, and, even when received quality of the initial transmission packet is deteriorated significantly, improve reception performance after packet combining.

Moreover, if the transmission power for the retransmission packet calculated in transmission power calculating section 105 exceeds the maximum power at which transmission by the transmitting apparatus is possible, transmission power calculating section 105 may command transmission power controlling section 106 to retransmit the retransmission packet at maximum power and designate the transmission rate (as well as data size and error correction coding rate) to coding section 102 via a signal line (not shown) such that error robustness increases.

By this means, even when transmission power exceeds the maximum value of transmission power at which transmission by the transmitting apparatus is possible, it is possible to improve reception performance after packet combining.

Moreover, although the present embodiment has been described above to perform the CRC check and NACK signal transmission for the received initial transmission packet at the receiving side, packets transmitted for the first time have parity bits mainly mapped therein and are decided to contain error in the CRC check for the initial transmission at the receiving side, so that the CRC check and NACK signal transmission processing may be removed. By this means, it is possible to remove the processing at the receiving apparatus.

Embodiment 2

A case has been described above with Embodiment 1 where the received SIR is used as received quality information. Now, a case will be described with Embodiment 2 of the present invention where the receiving side uses TPC (Transmission Power Control) commands to command the transmitting side to increase or decrease transmission power based on comparison between the received SIR and the target SIR.

Figure 4:
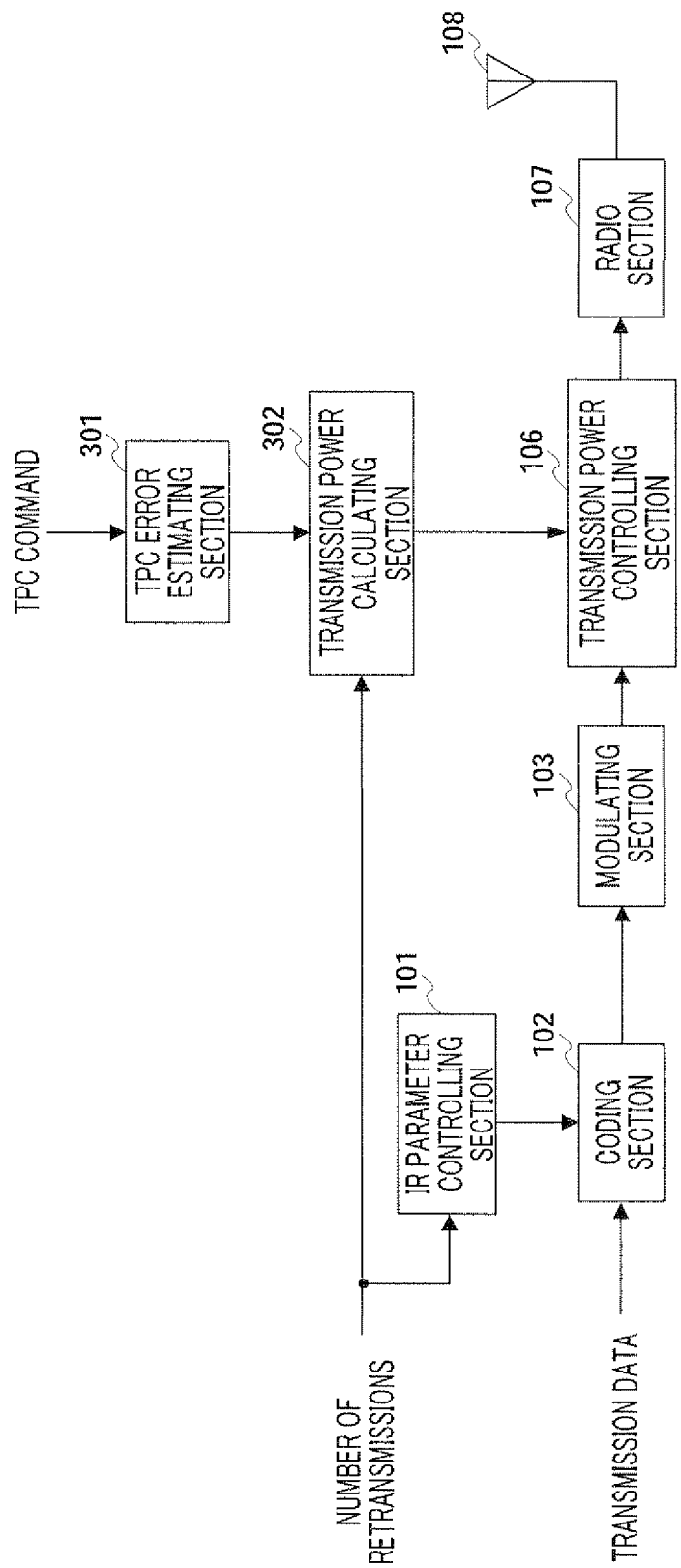
FIG. 4 shows a configuration of the transmitting apparatus according to Embodiment 2 of the present invention.

FIG. 4 shows a configuration of the transmitting apparatus according to Embodiment 2 of the present invention. Further, in FIG. 4, the same reference numerals are assigned to the same parts as in FIG. 2, and description thereof in detail will be omitted. FIG. 4 is different from FIG. 2 in that target value setting section 104 is removed, TPC error estimating section 301 is added and transmission power calculating section 105 is changed to transmission power calculating section 302.

As shown in FIG. 4, TPC error estimating section 301 acquires the TPC commands transmitted from the receiving side in a period a transmission packet is received, estimates the difference of the transmission packet in transmission power from the target SIR (TPC error) using the acquired TPC commands, and outputs the estimated TPC error to transmission power calculating section 302.

As for the method of estimating TPC error, suppose that TPC error is greater than the target SIR in the negative direction when there are more "up" TPC commands (increase) and TPC error is greater than the target SIR in the positive direction when there are more "down" TPC commands (decrease), and TPC error is zero when there are "up's" and "down's" in the same rate. For example, the method of estimating TPC error using a steplength for transmission power control is represented by the following equation 3.

(Equation 3)

TPC error=(total number of "up's"−total number of "down's")×steplength [3]

Figure 5:
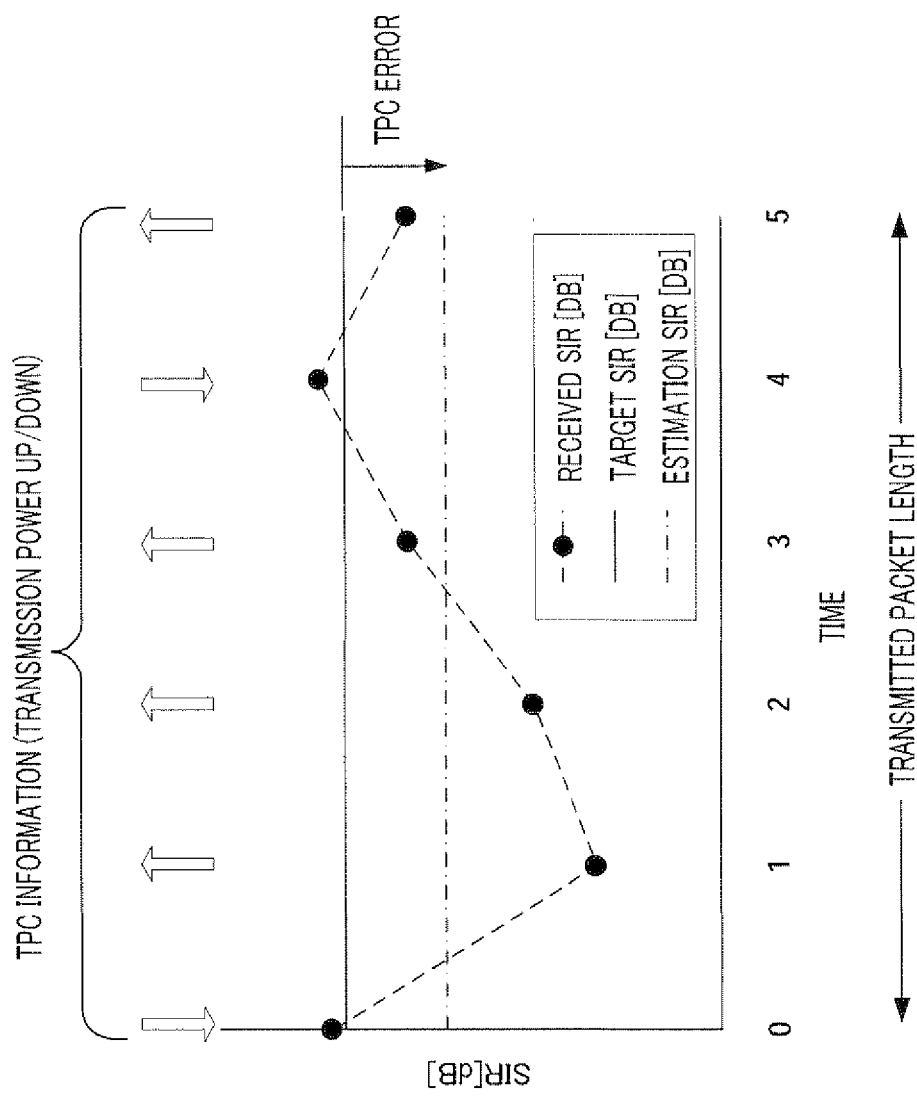
FIG. 5 illustrates a specific example of TPC commands transmitted from the receiving side in a transmission packet receiving period.

Here, FIG. 5 shows a specific example of TPC commands transmitted from the receiving side in a transmission packet receiving period. In FIG. 5, the longitudinal axis is SIR [dB], and the lateral axis is time. The received SIR is shown in a dotted line, and the target SIR is shown in a solid line. As a result of comparison of the received SIR and the target SIR at individual transmission power control timings, at time 0 and time 4, the received SIR is greater than the target SIR and therefore the TPC commands are "down," and, at times 1 to 3 and time 5, the received SIR is smaller than the target SIR and therefore the TPC commands are "up," making the total number of "up's" four and the total number of "down's" two. If the steplength is 1 dB, as derived from equation 3 represented above, the TPC error is 2 dB. Here, the total number of "up's" is greater than the total number of "down's", and the TPC error shows in the negative direction from the target SIR, and, in FIG. 5, the dashed-dotted line shows the estimation SIR.

Here, the accuracy of TPC error can be improved more by having the receiving side transmit TPC commands with reliability information of them and not using TPC commands of low reliability in the TPC error calculation of equation 3. Incidentally, reliability information refers to information showing reliability and likelihood of TPC commands. For example, when the difference between the SIR measured at the receiving side and the target SIR is less than a predetermined threshold, reliability is made lower, and, when the difference is greater than the threshold, reliability is made higher.

Based on the TPC error outputted from TPC error estimating section 301, transmission power calculating section 302 calculates the transmission power for the retransmission packet in which systematic bits are mapped. If the transmission power for the initial packet is P1 and the transmission power for the retransmission packet is P2, the method of calculating transmission power can be represented by the following equation 4:

(Equation 4)

$$P2 = P1 \times TPC\ error \qquad [4]$$

Moreover, when the transmission power for the retransmission packet is calculated taking into consideration of coding gain according to the number of retransmissions, if the amount of change for the necessary SIR fulfilling quality of interest from the previous transmission is $\Delta SIR_{target}$, the following equation 5 is represented:

(Equation 5)

$$P2 = P1 \times TPC\ error \times \Delta SIR_{target} \qquad [5]$$

In this way, according to Embodiment 2, by controlling transmission power for a retransmission packet, in which systematic bits are mapped, based on TPC commands used in transmission power control, it is possible to correct transmission power control differences and perform transmission power control in accordance with channel conditions. Moreover, by using existing TPC commands as received quality information, it is not necessary to add new control information, so that data transmission rate can be improved.

Embodiment 3

Cases have been described above with Embodiments 1 and 2 where packets are used as transmission units in which systematic bits and parity bits are mapped. Now, a case will be described with Embodiment 3 of the present invention where frames are used as transmission units in which systematic bits and the parity bits are mapped. Incidentally, the method of mapping systematic bits and parity bits in frames, and connecting a plurality of frames and performing error correction decoding at the receiving side, is referred to as "concatenate TTI" (Transmission Time Interval).

The configuration of the transmitting apparatus according to Embodiment 3 of the present invention is different only in that systematic bits and parity bits are mapped in frames in the configuration shown in FIG. 2, and will be explained with reference to FIG. 2.

Figure 6:
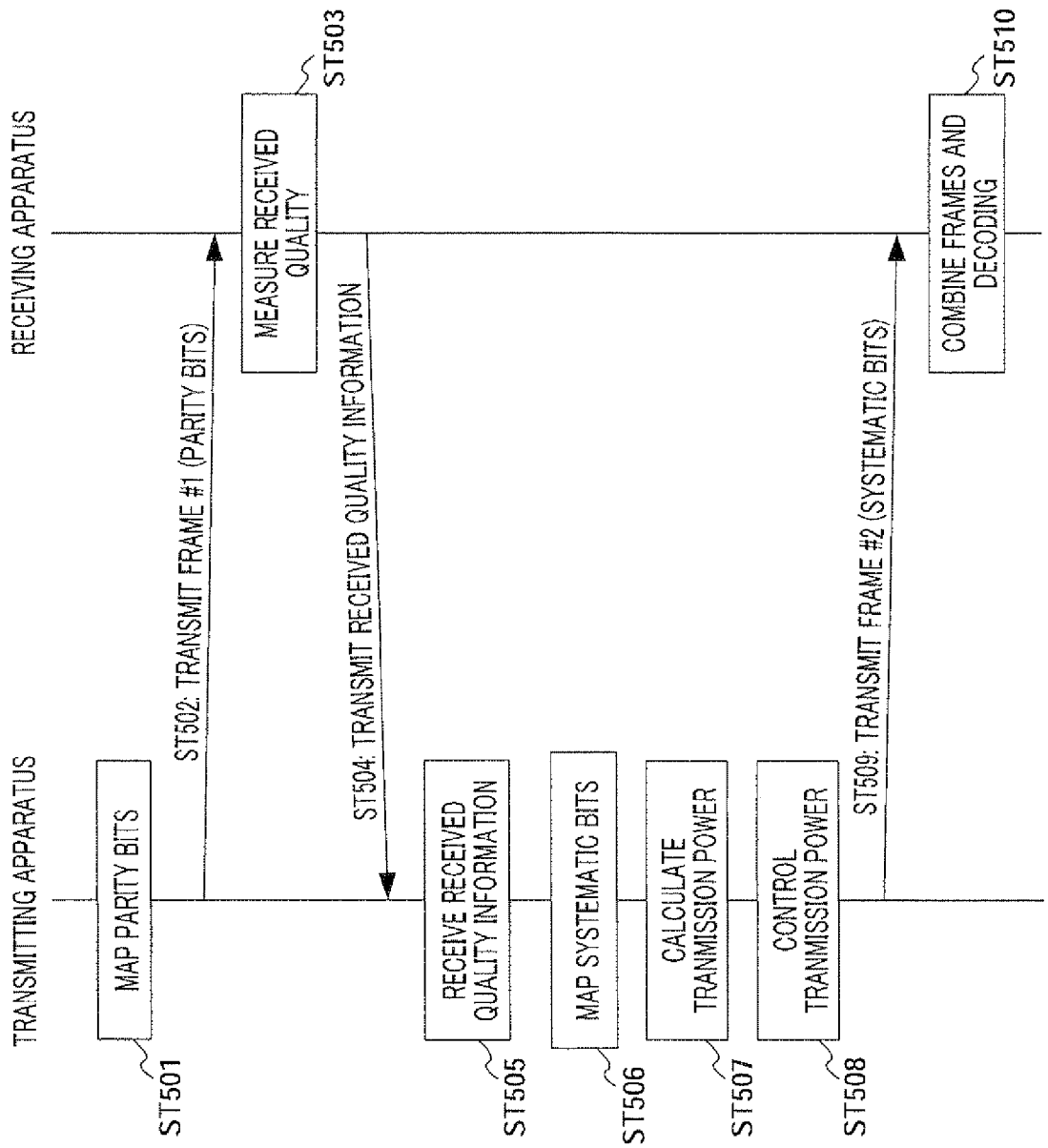
FIG. 6 illustrates a sequence diagram showing the steps of communications between the transmitting apparatus according to the Embodiment 3 and the receiving apparatus, which is a communicating party of this transmitting apparatus.

Here, the steps of communications between the transmitting apparatus described above and the receiving apparatus, which is a communicating party of this transmitting apparatus, will be explained using FIG. 6. Referring to FIG. 6, in ST501, IR parameter controlling section 101 controls coding section 102 to map parity bits in the frame #1 transmitted for the first time ("initial transmission frame #1"), and transmission power controlling section 106 controls the transmission power for the initial transmission frame #1 to transmission power set in advance in transmission power calculating section 105. In ST502, the transmitting apparatus transmits the initial transmission frame #1 in which parity bits are mapped, from radio section 107 to the receiving apparatus.

In ST503, the receiving apparatus receives the initial transmission frame #1 transmitted from the transmitting apparatus and measures received quality of the received initial transmission frame #1. In ST504, the receiving apparatus feeds back received quality information to the transmitting apparatus.

In ST505, the transmitting apparatus receives the received quality information fed back from the receiving apparatus, and in ST506, IR parameter controlling section 101 controls coding section 102 to map systematic bits in a second transmission frame #2.

In ST507, using the received quality information received in ST505, transmission power calculating section 105 calculates the transmission power for a second transmission frame #2, and, in ST508, transmission power controlling section 106 performs power control for a second transmission frame #2 with the transmission power calculated in ST507. In ST509, the transmitting apparatus transmits a second transmission frame #2 in which systematic bits are mapped, from radio section 107 to the receiving apparatus.

In ST510, the receiving apparatus receives the second transmission frame #2 transmitted from the transmitting apparatus, connects the received second transmission frame #2 and the initial transmission frame #1 received earlier, and decodes the connected frames.

In this way, according to Embodiment 3, by mapping and transmitting parity bits in a frame transmitted for the first time and controlling transmission power for a second transmission frame, in which systematic bits are mapped, based on received quality information for the frame transmitted for the first time fed back from the receiving side, systematic bits can be transmitted with transmission power matching channel conditions, so that it is possible to improve received quality of systematic bits and reception performance after frame connecting. Moreover, transmission power for systematic bits can be set to a minimum that can acquire received quality of interest, so that it is possible to reduce interference to other users and improve overall system throughput.

Although cases of controlling transmission power for retransmission packets or second transmission frames, in which systematic bits are mapped have been described above with the embodiments, the present invention is not limited to this, and it is equally possible to control transmission power for retransmission packets or second transmission frames transmitted for the second and subsequent times. By this means, received quality of retransmission packets or transmission frames can be improved at the timing the receiving side wants to decide there is no error, when the packets or the frames are transmitted at the maximum number of retransmissions which QoS (Quality of Service) permits, for example.

Moreover, although with the embodiments above cases have been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No.2005-296752, filed on Oct. 11, 2005, the entire content of which is expressly incorporated by reference herein.

INDUSTRIAL APPLICABILITY

The transmitting apparatus and the transmission method according to the present invention can improve received quality of systematic bits, reduce the number of retransmissions and improve throughput performance, and is applicable to, for example, the IR schemes of Hybrid-ARQ.

The invention claimed is:

1. A transmission apparatus comprising:
   a coding section that performs coding processing of transmission data including systematic bits and parity bits;
   a coding controlling section that controls the coding processing to map the parity bits in a first transmission unit and the systematic bits in a second transmission unit transmitted after the first transmission unit; and
   a transmission power controlling section that controls transmission power for the second transmission unit.

2. The transmission apparatus according to claim 1, wherein the coding controlling section controls to map the systematic bits in the first transmission unit with the parity bits.

3. The transmission apparatus according to claim 1, wherein the transmission power controlling section controls transmission power for the first transmission unit lower than the transmission power for the second transmission unit.

4. The transmission apparatus according to claim 1, wherein, when received quality information for the first transmission unit fed back from a reception side is equal to or lower than a predetermined value, the transmission power controlling section sets an offset for the transmission power for the second transmission unit.

5. The transmission apparatus according to claim 1, wherein, when the controlled transmission power for the second transmission unit exceeds maximum transmission power, the transmission power controlling section resets the controlled transmission power for the second transmission unit to the maximum transmission power.

6. The transmission apparatus according to claim 1, wherein, the transmission power controlling section uses transmission power control commands as the received quality information, and controls the transmission power for the second transmission unit based on "up's" commanding an increase of transmission power in the transmission power control commands and "down's" commanding a decrease of transmission power in the transmission power control commands.

7. The transmission apparatus according to claim 1, wherein, the transmission power controlling section uses transmission power control commands as the received quality information, and controls the transmission power for the second transmission unit based on a total number of "up's" commanding an increase of transmission power in the transmission power control commands and a total number of "down's" commanding a decrease of transmission power in the transmission power control commands, in a predetermined period.

8. The transmission apparatus according to claim 1, wherein, the transmission power controlling section uses a transmission power control command as the received quality information, and, upon acquiring reliability information for the transmission power control command, the transmission power controlling section decides whether or not to use the transmission power control command in controlling the transmission power for the second transmission unit based on the reliability information.

9. The transmission apparatus according to claim 1, wherein the transmission unit comprises a packet or a frame of a concatenate transmission time interval scheme.

10. A transmission method performed in a transmission apparatus, comprising:
    coding processing to transmission data including systematic bits and parity bits;
    controlling the coding processing to map the parity bits in a first transmission unit and the systematic bits in a second transmission unit transmitted after the first transmission unit; and
    controlling transmission power for the second transmission unit.

* * * * *